(12) United States Patent
Gatti

(10) Patent No.: US 9,729,573 B2
(45) Date of Patent: *Aug. 8, 2017

(54) PHISHING CAMPAIGN RANKER

(71) Applicant: Bank of America Corporation, Charlotte, NC (US)

(72) Inventor: Benjamin L. Gatti, Lake Park, NC (US)

(73) Assignee: Bank of America Corporation, Charlotte, NC (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/805,649

(22) Filed: Jul. 22, 2015

(65) Prior Publication Data

US 2017/0026410 A1    Jan. 26, 2017

(51) Int. Cl.
 *H04L 29/06* (2006.01)
(52) U.S. Cl.
 CPC ........ *H04L 63/1483* (2013.01); *H04L 63/145* (2013.01); *H04L 63/1416* (2013.01); *H04L 63/1425* (2013.01); *H04L 63/1433* (2013.01); *H04L 63/1441* (2013.01)
(58) Field of Classification Search
 CPC ............. H04L 63/1433; H04L 63/1441; H04L 63/1483
 See application file for complete search history.

(56) References Cited

U.S. PATENT DOCUMENTS

| 7,356,564 | B2 | 4/2008 | Hartselle et al. |
| 7,499,976 | B2 | 3/2009 | Cato |
| 7,603,718 | B2 | 10/2009 | Rounthwaite et al. |
| 7,908,328 | B1 | 3/2011 | Hulten et al. |
| 7,925,883 | B2 | 4/2011 | Florencio et al. |
| 7,930,289 | B2 | 4/2011 | Cheshire |
| 8,041,769 | B2 | 10/2011 | Shraim et al. |
| 8,255,468 | B2 | 8/2012 | Vitaldevara et al. |
| 8,352,318 | B2 | 1/2013 | Rikhtverchik et al. |

(Continued)

OTHER PUBLICATIONS

Prakash et al., A Reputation-Based Approach for Efficient Filtration of Spam, 2011, Cloudmark, Inc.,pp. 1-13, downloaded from https://www.cloudmark.com/en/s/resources/whitepapers/reputation-based-approach-for-efficient-filtration-of-spam on Sep. 13, 2016.*

*Primary Examiner* — Carl Colin
*Assistant Examiner* — Gary Lavelle
(74) *Attorney, Agent, or Firm* — Michael A. Springs

(57) ABSTRACT

According to one embodiment, an apparatus is configured to store a plurality of phishing scores, each phishing score of the plurality of phishing scores indicating a likelihood that a user will respond to a phishing email The apparatus is communicatively coupled to the memory and is configured to determine that a plurality of phishing campaigns are occurring. For each phishing campaign of the plurality of phishing campaigns, the apparatus is configured to determine that a plurality of users responded to the phishing campaign and to determine a priority score for the phishing campaign based on the phishing score of each user of the plurality of users. The apparatus is further configured to rank the plurality of phishing campaigns based on the priority score of each phishing campaign, wherein the phishing campaign of the plurality of phishing campaigns with the highest rank is reviewed first.

15 Claims, 3 Drawing Sheets

(56) References Cited

U.S. PATENT DOCUMENTS

| | | | |
|---|---|---|---|
| 8,381,292 B1 | 2/2013 | Warner et al. | |
| 8,484,741 B1 | 7/2013 | Chapman | |
| 8,615,807 B1 | 12/2013 | Higbee et al. | |
| 8,621,614 B2 | 12/2013 | Vaithilingam et al. | |
| 8,635,666 B2 | 1/2014 | Curnyn | |
| 8,635,703 B1 | 1/2014 | Belani et al. | |
| 8,640,231 B2 | 1/2014 | Florencio et al. | |
| 8,689,341 B1 | 4/2014 | Hartmann et al. | |
| 8,695,100 B1 | 4/2014 | Cosoi | |
| 8,719,940 B1 | 5/2014 | Higbee et al. | |
| 8,793,799 B2 | 7/2014 | Fritzson et al. | |
| 8,910,287 B1 | 12/2014 | Belani et al. | |
| 8,966,637 B2 | 2/2015 | Belani et al. | |
| 9,027,126 B2 * | 5/2015 | Larkins | G06F 21/554 713/182 |
| 9,367,872 B1 * | 6/2016 | Visbal | G06F 17/30601 |
| 2007/0192855 A1 * | 8/2007 | Hulten | G06F 17/30887 726/22 |
| 2008/0172738 A1 * | 7/2008 | Bates | G06F 17/30887 726/22 |
| 2010/0211641 A1 * | 8/2010 | Yih | G06F 15/16 709/206 |
| 2012/0046937 A1 | 2/2012 | Ocke et al. | |
| 2012/0124671 A1 * | 5/2012 | Fritzson | G06F 21/577 726/26 |
| 2013/0297375 A1 | 11/2013 | Chapman | |
| 2014/0230061 A1 * | 8/2014 | Higbee | H04L 63/1416 726/24 |
| 2014/0337995 A1 | 11/2014 | Fritzson et al. | |
| 2015/0012351 A1 | 1/2015 | Harding | |
| 2016/0014151 A1 * | 1/2016 | Prakash | H04L 63/1483 726/22 |

\* cited by examiner

PHISHING CAMPAIGN RANKER

TECHNICAL FIELD

This disclosure relates generally to a system for handling phishing emails.

BACKGROUND

Phishing emails and phishing campaigns place computing systems and networks at risk.

SUMMARY OF THE DISCLOSURE

According to one embodiment, an apparatus includes a memory and a processor. The memory is configured to store a plurality of phishing scores, each phishing score of the plurality of phishing scores indicating a likelihood that a user will respond to a phishing email The processor is communicatively coupled to the memory and is configured to determine that a plurality of phishing campaigns are occurring. For each phishing campaign of the plurality of phishing campaigns, the processor is configured to determine that a plurality of users responded to the phishing campaign and to determine a priority score for the phishing campaign based on the phishing score of each user of the plurality of users. The processor is further configured to rank the plurality of phishing campaigns based on the priority score of each phishing campaign, wherein the phishing campaign of the plurality of phishing campaigns with the highest rank is reviewed first.

According to another embodiment, a method includes storing, by a memory, a plurality of phishing scores, each phishing score of the plurality of phishing scores indicating a likelihood that a user will respond to a phishing email and determining, by a processor communicatively coupled to the memory, that a plurality of phishing campaigns are occurring. For each phishing campaign of the plurality of phishing campaigns, the method includes determining, by the processor, that a plurality of users responded to the phishing campaign and determining, by the processor, a priority score for the phishing campaign based on the phishing score of each user of the plurality of users. The method further includes ranking the plurality of phishing campaigns based on the priority score of each phishing campaign, wherein the phishing campaign of the plurality of phishing campaigns with the highest rank is reviewed first.

According to another embodiment, a system includes a plurality of users and a phishing management device configured to store a plurality of phishing scores, each phishing score of the plurality of phishing scores indicating a likelihood that a user will respond to a phishing email. The phishing management device is further configured to determine that a plurality of phishing campaigns are occurring. For each phishing campaign of the plurality of phishing campaigns, the phishing management device is configured to determine that the plurality of users responded to the phishing campaign and to determine a priority score for the phishing campaign based on the phishing score of each user of the plurality of users. The phishing management device is further configured to rank the plurality of phishing campaigns based on the priority score of each phishing campaign, wherein the phishing campaign of the plurality of phishing campaigns with the highest rank is reviewed first.

Certain embodiments may provide one or more technical advantages. For example, an embodiment may reduce the effectiveness of phishing campaigns. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
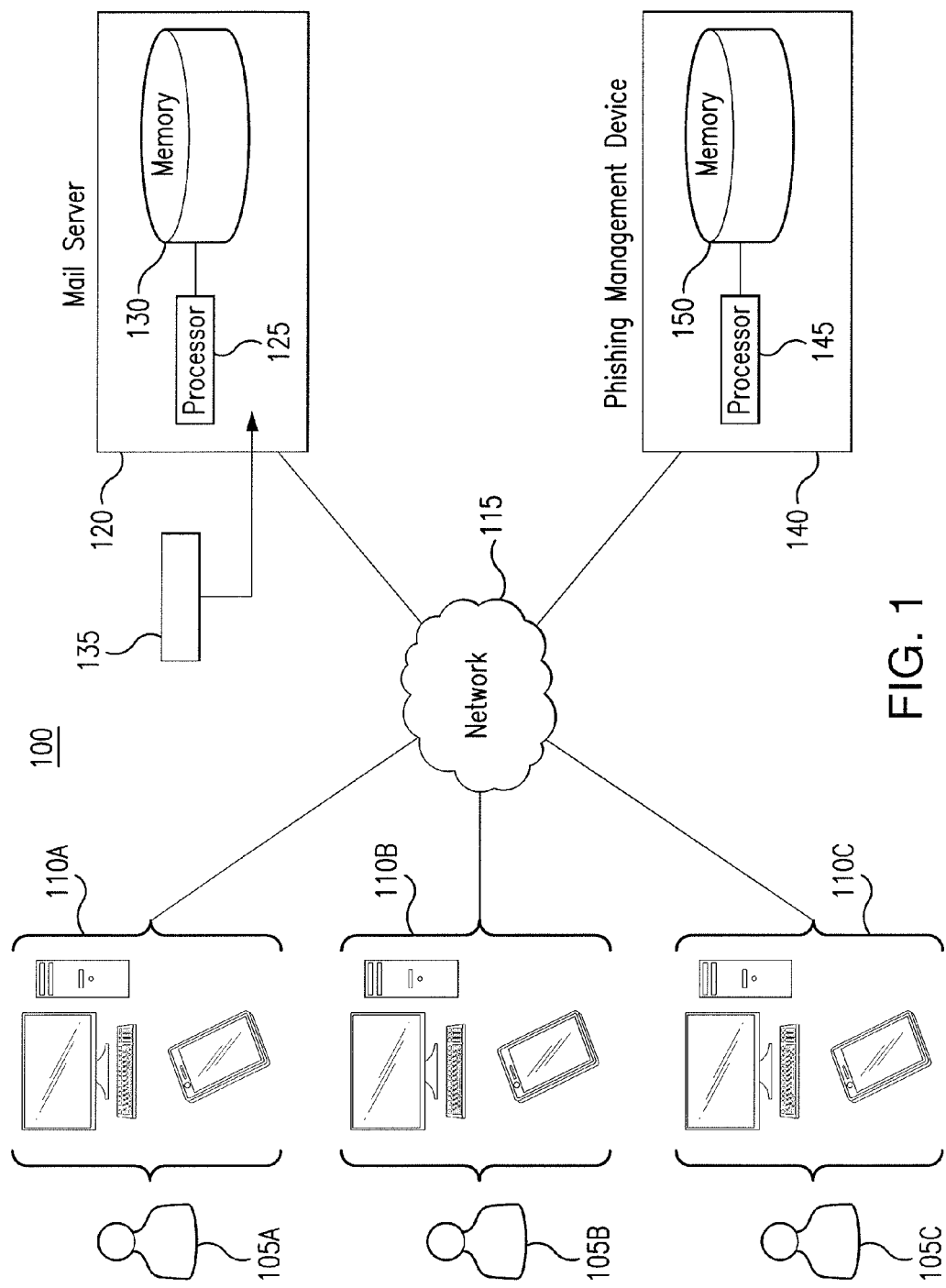
FIG. 1 illustrates a system for handling phishing emails.
Figure 2:
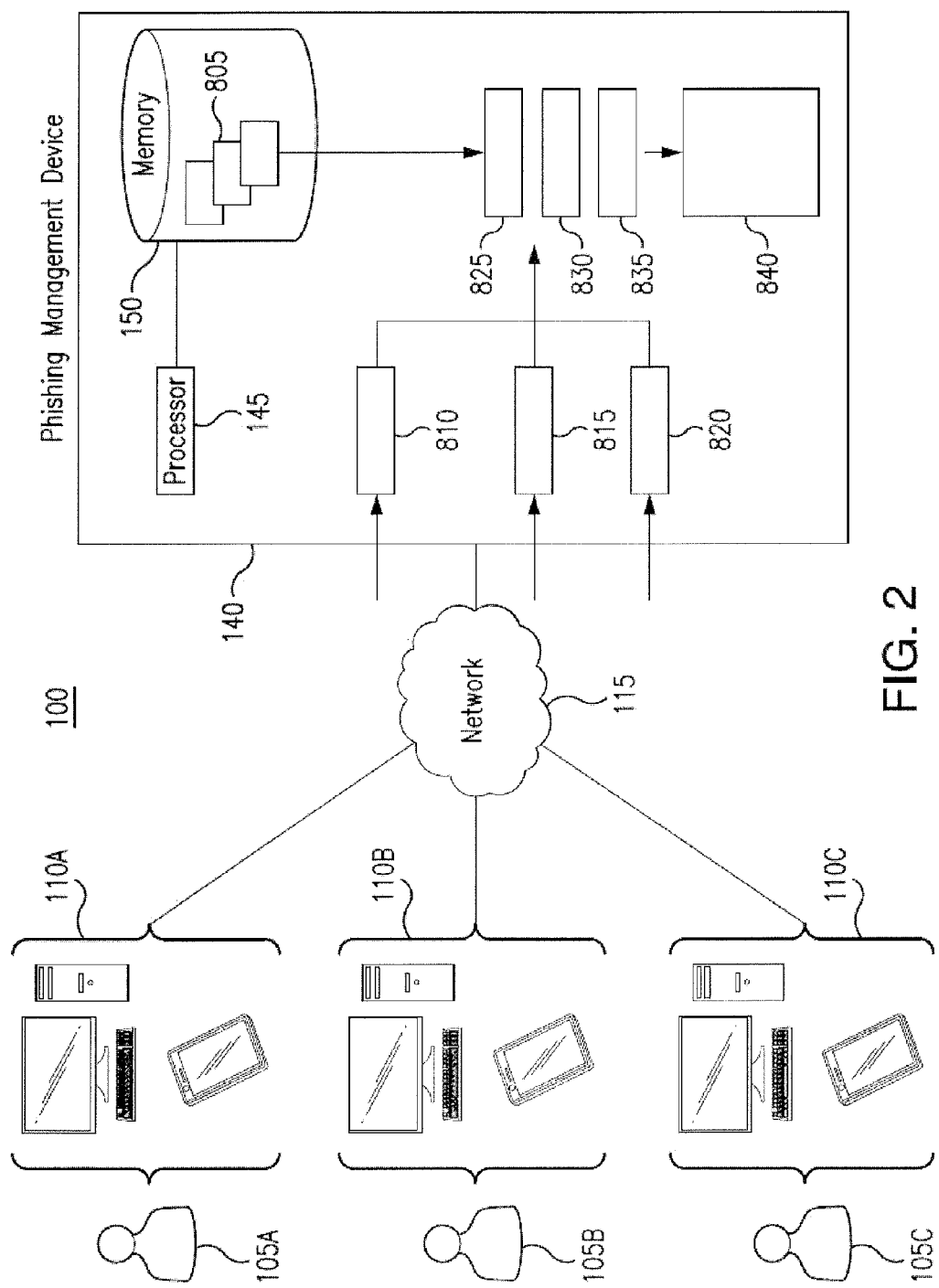
FIG. 2 illustrates ranking phishing campaigns using the system of FIG. 1.
Figure 3:
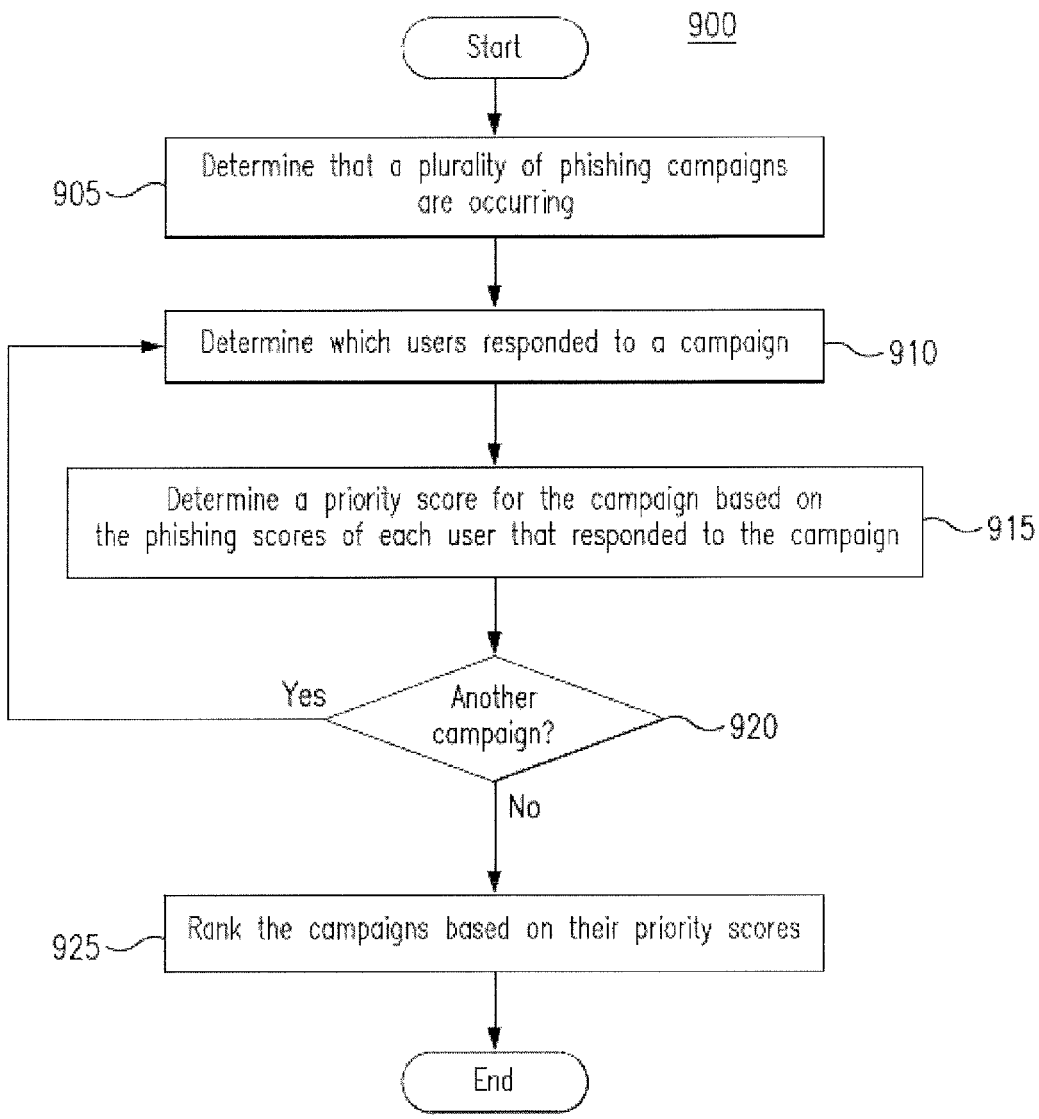
FIG. 3 is a flowchart illustrating a method of ranking phishing campaigns using the system of FIG. 1.

Embodiments of the present disclosure and its advantages are best understood by referring to FIGS. 1 through 3 of the drawings, like numerals being used for like and corresponding parts of the various drawings.

Phishing scams place computing systems and networks at substantial risk. Phishing typically involves the sending of emails and/or messages that attempt to deceive the recipient into providing personally identifiable information, passwords, and any other information that, when known by an unauthorized party, may threaten the security of the system and/or network. Phishing may also involve sending emails and/or messages that deceive the recipient into installing viruses and/or worms onto the recipient's device. Because the success of a phishing scam may depend on the response of only one recipient and because the number of recipients may be large, it may be difficult to prevent a phishing scam from jeopardizing the security of a system and/or network. For example, if a phishing email is sent to one thousand users on a network it may be difficult to ensure that all one thousand users do not fall victim to the phishing email.

This disclosure provides a system that may reduce the effectiveness of phishing scams and phishing campaigns. The system may rank phishing campaigns based on response rates to phishing emails of those phishing campaigns. In certain embodiments, by using this system, various technical advantages may be realized. For example, in one embodiment the system may reduce the effectiveness of phishing campaigns. The system will be described generally using FIG. 1. The various functions performed by the system will be described in more detail using FIGS. 2 and 3. Although this disclosure primarily describes phishing within the context of email, this disclosure contemplates phishing scams within any messaging context including text messaging, chat messaging, and/or any other appropriate messaging scheme.

FIG. 1 illustrates a system 100 for handling phishing emails. As provided in FIG. 1, system 100 includes users 105A, 105B and 105C, devices 110A, 110B, and 110C, network 115, mail server 120, and phishing management device 140. The components of system 100 may be communicatively coupled to each other through network 115. For ease of illustration, the number of illustrated components of system 100 is limited, but this disclosure contemplates system 100 including any number of users 105, devices 110, networks 115, mail servers 120, and phishing management devices 140.

A user 105 may use device 110 to perform various functions related to email. For example, user 105 may use device 110 to compose email, read email, reply and/or forward email, and/or delete email. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 may facilitate communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Mail server 120 may handle the email traffic of system 100. As provided in FIG. 1, mail server 120 may include a processor 125 and a memory 130. Processor 125 and memory 130 may be communicatively coupled to each other. This disclosure contemplates processor 125 and memory 130 being configured to perform any of the functions of mail server 120 described herein. For example, processor 125 and memory 130 may be configured to receive email and/or store email.

Processor 125 may execute software stored on memory 130 to perform any of the functions described herein. Processor 125 may control the operation and administration of mail server 120 by processing information received from network 115, device 110, and memory 130. Processor 125 may include any hardware and/or software that operates to control and process information. Processor 125 may be a programmable logic device, a microcontroller, a microprocessor, any suitable processing device, or any suitable combination of the preceding.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Mail server 120 may manage the email traffic of system 100. For example, mail server 120 may receive an email 135. Mail server 120 may then determine which user 105 is the intended recipient of email 135. Mail server 120 may then deliver email 135 to the appropriate device 110. Mail server 120 may also store email 135. When a user 105 uses device 110 to reply, forward, and/or delete email 135, mail server 120 may receive a command from the device 110. Mail server 120 may then respond appropriately to the command.

Phishing management device 140 may track and/or handle phishing emails received by system 100. As provided in FIG. 1, phishing management device 140 includes a processor 145 and a memory 150. This disclosure contemplates processor 145 and memory 150 being configured to perform any of the functions of phishing management device 140 described herein. Processor 145 may be communicatively coupled to memory 140.

Processor 145 may execute software stored on memory 150 to perform any of the functions described herein. Processor 145 may control the operation and administration of phishing management device 140 by processing information received from network 115, device 110, and memory 150. Processor 145 may include any hardware and/or software that operates to control and process information. Processor 145 may be a programmable logic device, a microcontroller, a microprocessor, any suitable processing device, or any suitable combination of the preceding.

Memory 150 may store, either permanently or temporarily, data, operational software, or other information for processor 145. Memory 150 may include any one or a combination of volatile or non-volatile local or remote devices suitable for storing information. For example, memory 150 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 150, a disk, a CD, or a flash drive. In particular embodiments, the software may include an application executable by processor 145 to perform one or more of the functions described herein.

Phishing management device 140 may perform various functions to reduce the effectiveness of phishing scams and phishing campaigns. For example, system 100 may rank phishing campaigns. System 100 may rank phishing campaigns based on phishing scores of certain users and how those users handle particular phishing emails. By ranking phishing campaigns, system 100 may allow an administrator to determine which phishing campaign should be addressed and/or handled first. Ranking phishing campaigns is discussed in more detail using FIGS. 2 and 3.

FIGS. 2 and 3 illustrate ranking phishing campaigns using the system 100 of FIG. 1. In some instances, phishing emails are not isolated events. Sometimes, phishing emails are part of a larger phishing campaign involving multiple or a series of phishing emails. Due to the scope and duration of phishing campaigns, it may be resource intensive for an administrator to handle them.

System 100 may provide a ranking of phishing campaigns that the administrator may follow. For example, the administrator may choose to handle the highest ranked campaign first. In particular embodiments, the ranking may indicate the threat posed by the campaign. By using system 100, the administrator may be able to devote immediate attention to the campaigns that pose the greatest threat.

FIG. 2 illustrates ranking phishing campaigns using the system 100 of FIG. 1. As provided in FIG. 2, phishing management device 140 may provide a ranking 840 of a plurality of phishing campaigns 810, 815 and 820. Rankings 840 may indicate which phishing campaign 810, 815, or 820 poses the greatest threat to system 100. For clarity, certain elements of system 100 have not been illustrated in FIG. 2, but their omission should not be construed as their elimination from system 100.

Phishing management device 140 may determine that a plurality of phishing campaigns 810, 815 and 820 are occurring. In particular embodiments, phishing management device 140 may make this determination based on phishing emails reported by one or more of users 105A, 105B, and 105C. Each phishing campaign 810, 815 and 820 may involve one or more phishing emails. By ranking phishing campaigns 810, 815 and 820, phishing management device 140 may provide an administrator insight into which campaign should be reviewed and/or handled first. This disclosure contemplates phishing management device 140 detecting and/or ranking any appropriate number of phishing campaigns.

Phishing management device 140 may store a plurality of phishing scores 805 in memory 150. Phishing scores 805 may correspond to users 105A, 105B and 105C. This disclosure contemplates phishing management device 140 storing any appropriate number of phishing scores 805 for any appropriate number of users 105. Each phishing score 805 may indicate how likely a user 105 will respond to a phishing email. For example, if a user's 105 phishing score 805 is high, it may indicate that that user 105 is likely to respond to a phishing email. If a user's 105 phishing score 805 is low, it may indicate that that user 105 is not likely to respond to a phishing email. This disclosure contemplates phishing management device 140 determining the plurality of phishing scores 805 in any appropriate manner.

For example, phishing management device 140 may send one or more fake and/or training phishing emails to a plurality of users 105. Based on how each user 105 responds to the fake and/or training phishing emails, phishing management device 140 may determine how likely it is that each user will respond to a phishing email in the future. Phishing management device 140 may then assign phishing scores 805 based on this determined likelihood. Phishing management device 140 may vary the number of users 105 that receive fake and/or training phishing emails to achieve more accurate results. Phishing management device 140 may also vary the type or content of fake and/or training phishing emails to achieve more accurate results. In particular embodiments, system 100 may rank phishing campaigns by correlating the plurality of responses of the recipients of the phishing campaign to the plurality of responses by the same recipients in prior simulated phishing tests.

In particular embodiments, phishing scores 805 may be determined by analyzing a deletion rate of a plurality of users 105A, 105B and 105C to a plurality of phishing emails. For example, if a user 105A deletes phishing emails frequently then phishing score 805 may be lower for user 105A because user 105A has demonstrated that he is not likely to respond to a phishing email. On the other hand and as another example, if user 105C has a low deletion rate for phishing emails, then phishing score 805 may be higher for user 105C because use 105C has demonstrated that he is likely to respond to a phishing email.

Phishing management device 140 may use phishing scores 805 to determine priority scores 825, 830 and 835 for phishing campaigns 810, 815 and 820. Each priority score 825, 830 and 835 may indicate how great a threat is posed by a particular phishing campaign 810, 815 and 820. For example, if phishing campaign 810 has a high priority score 825 it may indicate that phishing campaign 810 poses a large threat. As another example, if phishing campaign 815 has a low priority score 830, it may indicate that phishing campaign 815 poses a small threat. In particular embodiments, phishing management device 140 may use phishing scores 805 to determine priority scores 825, 830 and 835. For example, if user 105A has a low phishing score 805 (indicating that user 105A is not likely to respond to a phishing email), and phishing management device 140 determines that user 105A responded to a phishing email of phishing campaign 810, then phishing management device 140 may determine that phishing campaign 810 should be assigned a high priority score 825. On the other hand, if phishing score 805 indicates that user 105B is likely to respond to a phishing email, and phishing management device 140 determines that user 105B did not respond to a phishing email of phishing campaign 815, then phishing management device 140 may determine that phishing campaign 815 should be assigned a low priority score 830. This disclosure contemplates phishing management device 140 assigning any appropriate priority score in any appropriate manner.

In particular embodiments, phishing management device 140 may determine priority scores 825, 830 and 835 based on actions performed by users 105A, 105B and 105C when they received phishing emails associated with phishing campaigns 810, 815 and 820. For example, phishing management device 140 may determine that users 105A and 105B deleted phishing emails associated with phishing campaign 815. Phishing management device 140 may then analyze phishing scores 805 associated with users 105A and 105B. If phishing scores 805 indicate that users 105A and 105B are likely to respond to phishing emails, then phishing management device 140 may assign phishing campaign 815 a lower priority score because users 105A and 105B, who are likely to respond to phishing emails, deleted the phishing emails associated with phishing campaign 815. This indicates that phishing campaign 815 probably does not present a large threat. On the other hand and as another example, if user 105C responds to a phishing email associated with phishing campaign 820 and phishing score 805 associated with user 105C indicates that user 105C is not likely to respond to a phishing email, then phishing management device 140 may determine that phishing campaign 820 should be assigned a higher priority score 835 because a user 105C, who is not likely to respond to a phishing email, responded to the phishing email associated with phishing campaign 820. This indicates that phishing campaign 820 probably presents a large threat. Therefore, in both of these examples, the priority scores are inversely proportional to the phishing scores of the users.

In particular embodiments, priority scores 825, 830 and 835 may be based on the number of emails associated with phishing campaigns 810, 815 and 820. For example, if phishing campaign 810 is associated with a large number of phishing emails, priority score 825 may be high because a large number of phishing emails sent as part of phishing campaign 810 increases the threat presented by phishing campaign 810. On the other hand and as another example, if phishing campaign 820 is associated with a low number of phishing emails, then priority score 835 may be lower because a low number of phishing emails presents a lower threat.

In particular embodiments, priority scores 825, 830 and 835 may be based on a response rate to phishing emails associated with phishing campaigns 810, 815 and 820. For example, if emails associated with phishing campaign 810 have high response rates, then priority score 825 may be higher because if more users are responding to the phishing emails associated with phishing campaign 810, then phishing campaign 810 presents a larger threat. On the other hand and as another example, if phishing emails associated with phishing campaign 820 have a low response rate, then priority score 835 may be lower because if a lower number of users is responding to phishing emails associated with phishing campaign 820, then phishing campaign 820 presents a lower threat.

Phishing management device 140 may rank phishing campaigns 810, 815 and 820 using priority scores 825, 830 and 835. In particular embodiments, phishing management device 140 may give the highest rank to the phishing campaign with the highest priority score. In such instances the high priority score may indicate that the phishing campaign poses a large threat. This disclosure contemplates phishing management device 140 ranking phishing campaigns in any appropriate order. For example, phishing management device 140 may give the highest ranking to the phishing campaign that poses the least threat.

In certain embodiments, phishing management device 140 or an administrator may ignore phishing campaigns that are ranked low. For example, the lowest ranking campaign may be ignored because it presents the least or lowest threat to system 100. In this instance, phishing management device 140 may not include the lowest ranked campaign in rankings 840. As another example, the administrator may not handle the lowest ranked campaign.

In particular embodiments, by ranking phishing campaigns, system 100 may allow an administrator to respond to a phishing campaign that poses a great threat rather than a phishing campaign that poses a small threat. Ranking phishing campaigns may also allow an administrator to determine which campaigns may be ignored.

FIG. 3 is a flowchart illustrating a method 900 of ranking phishing campaigns using the system 100 of FIG. 1. In particular embodiments, phishing management device 140 may perform method 900. By performing method 900, phishing management device 140 may allow for better handling of phishing campaigns, which may lower the threat posed by phishing campaigns.

Phishing management device 140 may begin by determining that a plurality of phishing campaigns are occurring in step 905. In step 910, phishing management device 140 may determine which users responded to a campaign in the plurality of campaigns. In step 915, phishing management device 140 may determine a priority score for the campaign based on the phishing scores of each user that responded to the campaign. For example, if the phishing scores of the users that responded to the campaign indicate that the users are not likely to respond to phishing emails, then phishing management device 140 may determine a higher priority score for the phishing campaign.

In step 920, phishing management device 140 may determine if there is another campaign in the plurality of campaigns that should be assigned a priority score. If there is another campaign, phishing management device 140 may return to step 910. If there is not another phishing campaign, phishing management device 140 may conclude by ranking the campaigns based on their priority scores in step 925. In particular embodiments, the priority scores may indicate how large of a threat is presented by the phishing campaign. In certain embodiments, the ranking may provide a way to quickly analyze which campaigns should be responded to first or handled first.

Modifications, additions, or omissions may be made to method 900 depicted in FIG. 3. Method 900 may include more, fewer, or other steps. For example, steps may be performed in parallel or in any suitable order. While discussed as phishing management device 140 performing the steps, any suitable component of system 100, such as device 110 for example, may perform one or more steps of the method.

This disclosure contemplates users 105A, 105B and 105C responding to phishing emails in any appropriate manner. For example, users 105A, 105B and 105C may respond to a phishing email by clicking a link in the phishing email. As another example, users 105A, 105B and 105C may respond to a phishing email by replying to it. As another example, users 105A, 105B and 105C may respond to a phishing email by opening an attachment in the phishing email. As further examples, users 105A, 105B, and 105C may respond by forwarding the phishing email, deleting the phishing email, opening the phishing email, opening the phishing email, reading the phishing email, opening an attachment in the phishing email, calling a phone number in the phishing email, and/or reporting the phishing email.

Modifications, additions, or omissions may be made to system 100 without departing from the scope of the invention. For example, phishing management device 14 may be a distributed system. As another example, the components of system 100 may be integrated or separated. For example, mail server 120 may be incorporated into phishing management device 140, and vice versa.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory configured to store a plurality of phishing scores, each phishing score of the plurality of phishing scores indicating a likelihood that a user will respond to a phishing email; and
a processor communicatively coupled to the memory, the processor configured to:
determine that a first phishing campaign and a second phishing campaign are occurring based on a plurality of emails reported as phishing emails;
determine that a first user deleted an email of the first phishing campaign;
determine a priority score for the first phishing campaign based on a phishing score of the first user, the determination that that the first user deleted the email of the first phishing campaign, and a number of phishing emails sent as part of the first phishing campaign;
determine that a second user fell victim to an email of the second phishing campaign;
determine a priority score for the second phishing campaign based on a phishing score of the second user, the determination that the second user fell victim to the email of the second phishing campaign, and a number of phishing emails sent as part of the second phishing campaign;
determine that the priority score of the second phishing campaign is higher than the priority score of the first phishing campaign; and in response to the determination that the priority score of the second phishing campaign is higher than the priority score of the first phishing campaign, rank the second phishing campaign higher than the first phishing campaign so that the second phishing campaign is reviewed before the first phishing campaign.

2. The apparatus of claim 1, wherein the priority score for each phishing campaign is inversely proportional to the phishing score of a user of the plurality of users.

3. The apparatus of claim 1, wherein the plurality of phishing scores are determined by analyzing a response rate of a plurality of users to a plurality of phishing emails.

4. The apparatus of claim 1, wherein the phishing campaign of the plurality of phishing campaigns with the lowest ranking is ignored.

5. The apparatus of claim 1, wherein the plurality of users responded to the phishing campaign by clicking a link within a phishing email sent as part of the phishing campaign.

6. A method comprising:
storing, by a memory, a plurality of phishing scores, each phishing score of the plurality of phishing scores indicating a likelihood that a user will respond to a phishing email;
determining, by a processor communicatively coupled to the memory, that a first phishing campaign and a second phishing campaign are occurring based on a plurality of emails reported as phishing emails;
determining that a first user deleted an email of the first phishing campaign;
determining a priority score for the first phishing campaign based on a phishing score of the first user, the determination that that the first user deleted the email of the first phishing campaign, and a number of phishing emails sent as part of the first phishing campaign;
determining that a second user fell victim to an email of the second phishing campaign;
determining a priority score for the second phishing campaign based on a phishing score of the second user, the determination that the second user fell victim to the email of the second phishing campaign, and a number of phishing emails sent as part of the second phishing campaign;
determining that the priority score of the second phishing campaign is higher than the priority score of the first phishing campaign; and
in response to the determination that the priority score of the second phishing campaign is higher than the priority score of the first phishing campaign, ranking the second phishing campaign higher than the first phishing campaign so that the second phishing campaign is reviewed before the first phishing campaign.

7. The method of claim 6, wherein the priority score for each phishing campaign is inversely proportional to the phishing score of a user of the plurality of users.

8. The method of claim 6, wherein the plurality of phishing scores are determined by analyzing a response rate of a plurality of users to a plurality of phishing emails.

9. The method of claim 6, wherein the phishing campaign of the plurality of phishing campaigns with the lowest ranking is ignored.

10. The method of claim 6, wherein the plurality of users responded to the phishing campaign by clicking a link within a phishing email sent as part of the phishing campaign.

11. A system comprising:
a plurality of users; and
a phishing management device comprising:
a memory configured to store a plurality of phishing scores, each phishing score of the plurality of phishing scores indicating a likelihood that a user will respond to a phishing email; and
a processor communicatively coupled to the memory and configured to:
determine that a first phishing campaign and a second phishing campaign are occurring based on a plurality of emails reported as phishing emails;
determine that a first user deleted an email of the first phishing campaign;
determine a priority score for the first phishing campaign based on a phishing score of the first user, the determination that that the first user deleted the email of the first phishing campaign, and a number of phishing emails sent as part of the first phishing campaign;
determine that a second user fell victim to an email of the second phishing campaign;
determine a priority score for the second phishing campaign based on a phishing score of the second user, the determination that the second user fell victim to the email of the second phishing campaign, and a number of phishing emails sent as part of the second phishing campaign;
determine that the priority score of the second phishing campaign is higher than the priority score of the first phishing campaign; and
in response to the determination that the priority score of the second phishing campaign is higher than the priority score of the first phishing campaign, rank the second phishing campaign higher than the first phishing campaign so that the second phishing campaign is reviewed before the first phishing campaign.

12. The system of claim 11, wherein the priority score for each phishing campaign is inversely proportional to the phishing score of a user of the plurality of users.

13. The system of claim 11, wherein the plurality of phishing scores are determined by analyzing a response rate of a plurality of users to a plurality of phishing emails.

14. The system of claim 11, wherein the phishing campaign of the plurality of phishing campaigns with the lowest ranking is ignored.

15. The system of claim 11, wherein the plurality of users responded to the phishing campaign by clicking a link within a phishing email sent as part of the phishing campaign.

* * * * *